(12) United States Patent
Chen et al.

(10) Patent No.: US 12,060,030 B2
(45) Date of Patent: Aug. 13, 2024

(54) SAFETY AIRBAG DEVICE

(71) Applicant: Autoliv Development AB, Vargarda (SE)

(72) Inventors: Wujian Chen, Shanghai (CN); Xiaoyu Liang, Shanghai (CN); Shaobing Shao, Shanghai (CN); Liang Huang, Shanghai (CN)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/753,350

(22) PCT Filed: Jun. 4, 2020

(86) PCT No.: PCT/CN2020/094318
§ 371 (c)(1),
(2) Date: Feb. 28, 2022

(87) PCT Pub. No.: WO2021/036389
PCT Pub. Date: Mar. 4, 2021

(65) Prior Publication Data
US 2022/0314923 A1    Oct. 6, 2022

(30) Foreign Application Priority Data

Aug. 30, 2019    (CN) .......................... 201910812540.2

(51) Int. Cl.
*B60R 21/261* (2011.01)
*B60R 21/2346* (2011.01)

(52) U.S. Cl.
CPC ........ *B60R 21/261* (2013.01); *B60R 21/2346* (2013.01); *B60R 2021/2612* (2013.01)

(58) Field of Classification Search
CPC .......... B60R 21/261; B60R 2021/2612; B60R 21/2346
See application file for complete search history.

(56) References Cited

U.S. PATENT DOCUMENTS

| | | | |
|---|---|---|---|
| 6,283,499 B1 * | 9/2001 | Nelsen | B60R 21/2346 280/743.1 |
| 6,361,067 B1 * | 3/2002 | Varcus | B60R 21/2346 280/740 |
| 2004/0188987 A1 * | 9/2004 | Salmo | B60R 21/232 280/740 |

(Continued)

FOREIGN PATENT DOCUMENTS

| | | |
|---|---|---|
| CN | 102452373 A | 5/2012 |
| CN | 105083203 A | 11/2015 |
| JP | 2015-526343 | 9/2015 |

*Primary Examiner* — Barry Gooden, Jr.
(74) *Attorney, Agent, or Firm* — Foley & Lardner LLP

(57) ABSTRACT

A safety airbag device, including a safety airbag having an inflated state and a stowed state, a gas generator, used to generate gas to inflate the safety airbag so that the safety airbag enters the inflated state; and a deflector, used to guide the gas generated by the gas generator before the gas generated by the gas generator enters the safety airbag. The deflector includes a first cavity and a second cavity. The first cavity includes a first gas inlet and a first gas outlet. The second cavity includes a second gas inlet and a second gas outlet. The first gas outlet and the second gas inlet are in fluid communication with each other.

7 Claims, 2 Drawing Sheets

(56) References Cited

U.S. PATENT DOCUMENTS

| | | | |
|---|---|---|---|
| 2007/0138773 A1 | 6/2007 | Song | |
| 2007/0200321 A1* | 8/2007 | Heitplatz | B60R 21/206 |
| | | | 280/740 |
| 2008/0143086 A1* | 6/2008 | Higuchi | B60R 21/2346 |
| | | | 280/736 |
| 2010/0225094 A1 | 9/2010 | Rose et al. | |
| 2010/0276917 A1 | 11/2010 | Chavez et al. | |
| 2011/0101660 A1* | 5/2011 | Schneider | B60R 21/206 |
| | | | 280/731 |
| 2011/0298201 A1* | 12/2011 | Kobayashi | B60R 21/23138 |
| | | | 280/736 |
| 2014/0103625 A1* | 4/2014 | Thomas | B60R 21/261 |
| | | | 280/730.2 |
| 2016/0101758 A1* | 4/2016 | Fujiwara | B60R 21/23138 |
| | | | 280/729 |
| 2017/0267206 A1* | 9/2017 | Hanks | B60R 21/2346 |

* cited by examiner

SAFETY AIRBAG DEVICE

TECHNICAL FIELD

The present invention relates to the field of vehicle safety devices, and relates in particular to a safety airbag device.

BACKGROUND

A safety airbag device is commonly used in a vehicle to protect an occupant in the vehicle from injury in an emergency situation. The safety airbag device includes a safety airbag and a gas generator. The safety airbag is generally in a stowed state, and is inflated only when the vehicle encounters a collision or impact. When the vehicle encounters a collision or impact, gas generated by means of blasting performed by the gas generator rapidly inflates the safety airbag in the stowed state, and the inflated safety airbag expands to provide protection for the occupant of the vehicle. However, since the gas generator needs to generate a large amount of gas in a very short time, an airbag of the safety airbag device is subjected to a large impact, and this may cause the airbag to be torn. In addition, when blasting occurs, some metal material components (for example, an aluminum foil or a copper foil located at a gas outlet of the gas generator) in the gas generator are melted due to high temperature. Therefore, the gas generated by the gas generator carries high-temperature metal particles, and collision of the high-temperature metal particles with the airbag results in formation of melt holes on the airbag.

Therefore, a highly reliable safety airbag device is desired.

SUMMARY

The objective of the present invention is to provide a highly reliable safety airbag device. In order to achieve the above objective, the present invention provides a safety airbag device, comprising:
 a safety airbag, having an inflated state and a stowed state;
 a gas generator, used to generate gas to inflate the safety airbag so that the safety airbag enters the inflated state; and
 a deflector, used to guide the gas generated by the gas generator before the gas generated by the gas generator enters the safety airbag,
 wherein the deflector comprises a first cavity and a second cavity, the first cavity comprises a first gas inlet and a first gas outlet, the second cavity comprises a second gas inlet and a second gas outlet, the first gas outlet and the second gas inlet are in fluid communication with each other, and the gas generated by the gas generator enters the first cavity by means of the first gas inlet, exits the first cavity by means of the first gas outlet, then enters the second cavity by means of the second gas inlet in fluid communication with the first gas outlet, exits the second cavity by means of the second gas outlet, and then enters the safety airbag.

According to an embodiment of the present invention, the first gas inlet, the first gas outlet, the second gas inlet, and the second gas outlet are configured so that the gas generated by the gas generator enters the first cavity by means of the first gas inlet in a first direction, exits the first cavity by means of the first gas outlet, enters the second cavity by means of the second gas inlet in a second direction, exits the second cavity by means of the second gas outlet in a third direction, and then enters the safety airbag, wherein the first direction is different from the second direction, and the second direction is different from the third direction.

According to an embodiment of the present invention, the first cavity and the second cavity are configured to be a vertical two-piece structure.

According to an embodiment of the present invention, the first gas inlet is arranged at a joint between a first upper member and a first lower member of the first cavity, the first gas outlet is arranged on the first lower member, the second gas inlet is arranged on a second upper member of the second cavity, and the second gas outlet is arranged at a joint between the second upper member and the second lower member of the second cavity.

According to an embodiment of the present invention, the first lower member of the first cavity and the second upper member of the second cavity are configured to have a common portion, and the first gas outlet and the second gas inlet are configured to be located on the common portion to serve as a common opening.

According to an embodiment of the present invention, the first upper member, the first lower member, the second upper member, and the second lower member are configured to be from different sections of the same piece of material.

According to an embodiment of the present invention, a size of the second gas outlet is configured to be greater than a size of the second gas inlet.

According to an embodiment of the present invention, a volume of the first cavity in the inflated state is designed to be greater than a volume of the second cavity in the inflated state.

DETAILED DESCRIPTION

Specific implementation manners of the safety airbag device according to the present invention will be described below with reference to the accompanying drawings. The following detailed description and accompanying drawings serve to exemplarily illustrate the principles of the present invention. The present invention is not limited to the described preferred embodiments, and the scope of protection of the present invention is defined by the claims.

In addition, spatially relative terms (such as "upper," "lower," "left," "right," etc.) are used to describe a relative positional relationship between one element and another element shown in the accompanying drawings. Therefore, spatially relative terms may be applied to directions different from the directions shown in the accompanying drawings when used. Obviously, although all of these spatially relative terms refer to the directions shown in the accompanying drawings for ease of description, those skilled in the art could understand that directions different from the directions shown in the accompanying drawings may be used.

Figure 1:
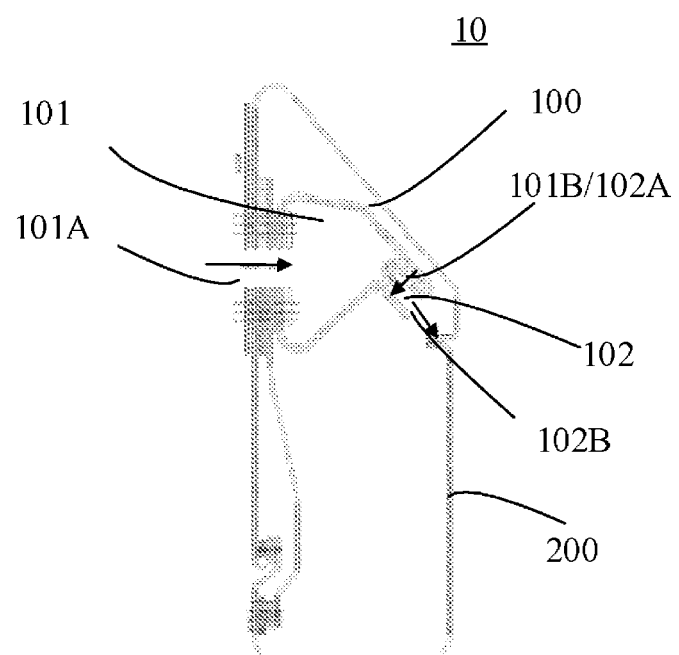
FIG. 1 is a schematic cross-sectional view of a safety airbag device according to an embodiment of the present invention.

FIG. 1 is a schematic perspective view of the safety airbag device according to an embodiment of the present invention.

The safety airbag device according to the embodiment of the present invention is described below with reference to FIG. 1.

As shown in FIG. 1, a safety airbag device 10 includes a safety airbag 200 and a gas generator (not shown). The safety airbag 200 has an inflated state and a stowed state. In addition, the safety airbag 200 shown in FIG. 1 is in the inflated state. The gas generator is used to generate gas to inflate the safety airbag 200 so that the safety airbag 200 enters the inflated state.

In addition, as shown in FIG. 1, the safety airbag device 10 further includes a deflector 100. The deflector 100 is used to guide the gas generated by the gas generator before the gas generated by the gas generator enters the safety airbag 200. Next, the deflector 100 is described in detail.

Figure 2:
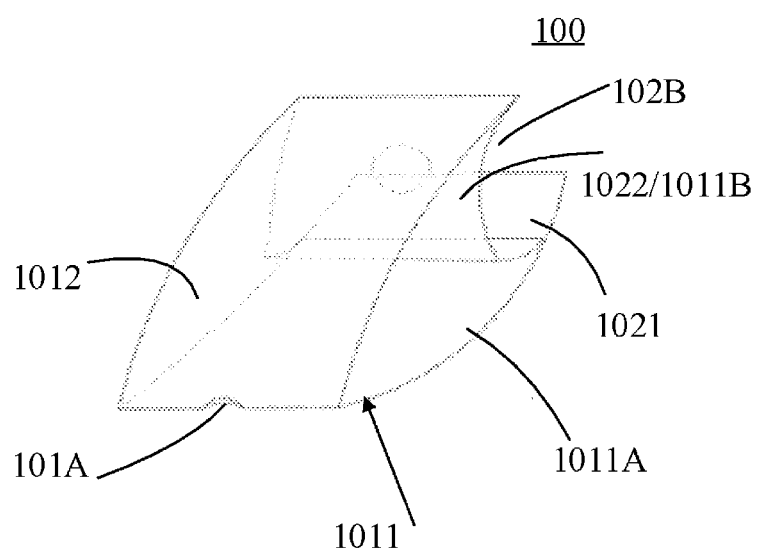
FIG. 2 is a schematic perspective view of a safety airbag device according to an embodiment of the present invention.

FIG. 2 is a schematic perspective view of the safety airbag device according to an embodiment of the present invention. The deflector in the safety airbag device according to the embodiment of the present invention is described below with reference to FIG. 1 and FIG. 2.

As shown in FIG. 1 and FIG. 2, the deflector 100 includes a first cavity 101 and a second cavity 102. The first cavity 101 includes a first gas inlet 101A and a first gas outlet 101B. The second cavity 102 includes a second gas inlet 102A and a second gas outlet 102B. It can be seen from FIG. 1 and FIG. 2 that the first gas outlet 101B and the second gas inlet 102A are configured to be a common opening. Hence, as shown in FIG. 1, the gas generated by the gas generator enters the first cavity 101 by means of the first gas inlet 101A, exits the first cavity 101 by means of the first gas outlet 101B, then enters the second cavity 102 by means of the second gas inlet 102A, exits the second cavity 102 by means of the second gas outlet 102B, and then enters the safety airbag 200.

Continuing to refer to FIG. 1, in the safety airbag device 10 according to the embodiment of the present invention, the first gas inlet 101A, the first gas outlet 101B, the second gas inlet 102A, and the second gas outlet 102B are configured so that the gas generated by the gas generator enters the first cavity 101 by means of the first gas inlet 101A in a first direction, exits the first cavity 101 by means of the first gas outlet 101B, enters the second cavity 102 by means of the second gas inlet 102A in a second direction, exits the second cavity 102 by means of the second gas outlet 102B in a third direction, and then enters the safety airbag 100. The first direction is different from the second direction, and the second direction is different from the third direction. In FIG. 1, three arrows are respectively used to represent the aforementioned first direction, second direction, and third direction. It can be seen from FIG. 1 that the gas generated by the gas generator enters the first cavity 101 by means of the first gas inlet 101A in a horizontal direction, exits the first cavity 101 by means of the first gas outlet 101B, enters the second cavity 102 by means of the second gas inlet 102A in a downward-left direction, exits the second cavity 102 by means of the second gas outlet 102B in a downward-right direction, and then enters the safety airbag 100. Therefore, in FIG. 1, the deflector 100 changes a flow direction of the gas generated by the gas generator from the horizontal direction to the downward-right direction, so that the gas generated by the gas generator enters the safety airbag 200 in the downward-right direction, thereby preventing an airflow from directly striking the safety airbag and causing the safety airbag to tear.

Continuing to refer to FIG. 2, the first cavity 101 and the second cavity 102 are configured to be a vertical two-piece structure. It should be noted that in the safety airbag device according to the present invention, the vertical two-piece structure of the deflector should be understood in a broad sense. That is, the deflector has a two-piece structure. In addition, the vertical two-piece structure is named in the case of a certain specific placement orientation, but the name actually includes all placement orientations different from the certain specific placement orientation. Therefore, no limitation is set to the orientation, and this naming convention is used merely for ease of description. For example, a left-right two-piece structure and a front-rear two-piece structure are both included in the two-piece structure of the deflector in the safety airbag device according to the present invention. The deflector body 100 is specifically described below. The first cavity 101 includes a first lower member 1011 and a first upper member 1012. The second cavity 102 includes a second upper member 1022 and a second lower member 1021. It should be noted that a first portion 1011A of the first lower member 1011 of the first cavity 101 serves merely as the first lower member of the first cavity 101, but a second portion 1011B of the first lower member 1011 of the first cavity 101 not only serves as the first lower member 1011 of the first cavity 101 but also serves as the second upper member 1022 of the second cavity 102. In other words, the first lower member 1011 of the first cavity 101 and the second upper member 1022 of the second cavity 102 are configured to have the common portion 1011B, and the first gas outlet and the second gas inlet are configured to be located on the common portion and serve as a common opening. In addition, the first gas inlet 101A is arranged at a joint between the first upper member and the first lower member of the first cavity 101. The joint is on a left side of the first cavity 101 in FIG. 2. Moreover, the second gas outlet 102B is arranged at a joint between the second upper member and the second lower member of the second cavity 102. The joint is on a right side of the second cavity 102 in FIG. 2.

Therefore, in the safety airbag device according to the present invention, in addition to, as described above, changing the flow direction of the gas generated by the gas generator and preventing the airflow from directly striking the safety airbag and causing the safety airbag to tear, respective wall surfaces in the first cavity and the second cavity of the deflector contact the gas generated by the gas generator, such that high-temperature metal particles generated by the generator are captured on the wall surfaces by means of contacting. Since the gas generated by the gas generator firstly passes through the large first cavity and then passes through the small second cavity, in the second cavity, the wall surface of the cavity more fully contacts the gas, thus a capturing effect on the wall surface of the second cavity is better. In this way, improvements are made to the scenario in which the high-temperature metal particles strike the safety airbag and therefore result in the formation of melt holes in the safety airbag. Therefore, the safety airbag device according to the present invention is highly reliable.

Figure 3:
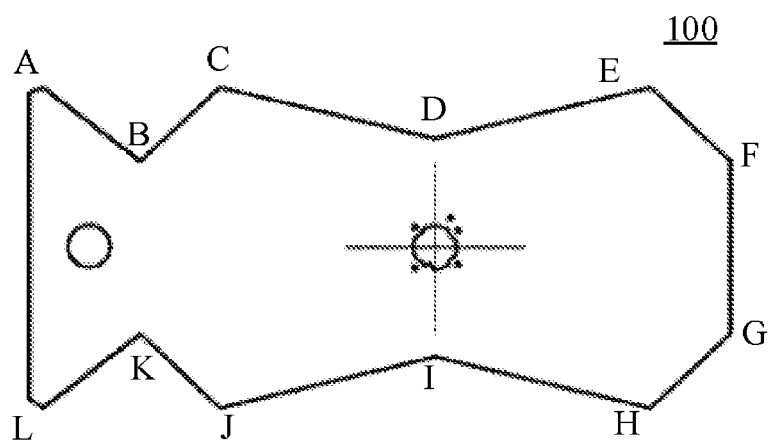
FIG. 3 is a schematic unfolded view of a deflector in a safety airbag device according to an embodiment of the present invention.

FIG. 3 is a schematic unfolded view of the deflector in the safety airbag device according to an embodiment of the present invention. An unfolded structure of the deflector in the safety airbag device according to the embodiment of the present invention will be described below with reference to FIG. 3.

As shown in FIG. 3, in the deflector 100, the first upper member 1012 and the first lower member 1011 of the first cavity 101 and the second upper member 1022 and the second lower member 1021 of the second cavity 102 are configured to be from different sections of the same piece of material. Specifically, section ABKL serves as a common portion, and is used as the second upper member 1022 of the second cavity 102 and the portion 1011B of the first lower member 1011 of the first cavity 101. Section BCDIJK is used as the first upper member 1012 of the first cavity 101. Section DEHI is used as the portion 1011A of the first lower member 1011 of the first cavity 101. Section EFGH is used as the second lower member 1021 of the second cavity 102. The deflector 100 may be manufactured by bending section ABKL backwards until point A and point L respectively align with point E and point H, and point B and point K respectively align with point F and point G. Then, respective edges of all sections (AL and EH; AB, BC, and EF; LK, KJ, and HG) are connected to each other by means of stitching, gluing, etc.

As a preferred embodiment of the present invention, a size of the second gas outlet is configured to be greater than a size of the second gas inlet. However, those skilled in the art could understand that the safety airbag device according to the present invention is not limited to the above embodiments, and a size relationship between the second gas outlet and the second gas inlet may be designed differently according to actual requirements.

As a preferred embodiment of the present invention, a volume of the first cavity in the inflated state is designed to be greater than a volume of the second cavity in the inflated state. However, those skilled in the art could understand that the safety airbag device according to the present invention is not limited to the above embodiments, and a volume relationship between the first cavity and the second cavity in the inflated state may be designed differently according to actual requirements.

Although in the above embodiments, the first lower member of the first cavity and the second upper member of the second cavity are configured to have a common portion, the first gas outlet and the second gas inlet are designed to serve as a common opening, and the common opening is arranged on the common portion, those skilled in the art could understand that the safety airbag device according to the present invention is not limited to the above embodiments. The first lower member of the first cavity and the second upper member of the second cavity may be configured to be independent two-piece structures. The first lower member and the first upper member of the first cavity may be configured to be independent two-piece structures. The first gas outlet and the second gas inlet may be designed to be in fluid communication with each other and be respectively located at the first lower member of the first cavity and the second upper member of the second cavity.

As described above, although the exemplary embodiments of the present invention have been described in the specification with reference to the accompanying drawings, the present invention is not limited to the aforementioned specific implementation manners, and the scope of protection of the present invention should be defined by the claims and equivalent meanings thereof.

The invention claimed is:

1. A safety airbag device, comprising:
a safety airbag, having an inflated state and a stowed state;
a gas generator, used to generate gas to inflate the safety airbag so that the safety airbag enters the inflated state; and
a deflector, used to guide the gas generated by the gas generator before the gas generated by the gas generator enters the safety airbag,
wherein the deflector comprises a first cavity and a second cavity, the first cavity comprises a first gas inlet and a first gas outlet, the second cavity comprises a second gas inlet and a second gas outlet, the first gas outlet and the second gas inlet are in fluid communication with each other, and the gas generated by the gas generator enters the first cavity by means of the first gas inlet, exits the first cavity by means of the first gas outlet, then enters the second cavity by means of the second gas inlet in fluid communication with the first gas outlet, exits the second cavity by means of the second gas outlet, and then enters the safety airbag,
wherein the first gas inlet is arranged at a joint between a first upper member and a first lower member of the first cavity, the first gas outlet is arranged on the first lower member, the second gas inlet is arranged on a second upper member of the second cavity, and the second gas outlet is arranged at a joint between the second upper member and a second lower member of the second cavity.

2. The safety airbag device according to claim 1, wherein the first gas inlet, the first gas outlet, the second gas inlet, and the second gas outlet are configured so that the gas generated by the gas generator enters the first cavity by means of the first gas inlet in a first direction, exits the first cavity by means of the first gas outlet, enters the second cavity by means of the second gas inlet in a second direction, exits the second cavity by means of the second gas outlet in a third direction, and then enters the safety airbag, wherein the first direction is different from the second direction, and the second direction is different from the third direction.

3. The safety airbag device according to claim 2, wherein the first cavity and the second cavity are configured to be a vertical two-piece structure.

4. The safety airbag device according to claim 1, wherein the first lower member of the first cavity and the second upper member of the second cavity are configured to have a common portion, and the first gas outlet and the second gas inlet are configured to be located on the common portion to serve as a common opening.

5. The safety airbag device according to claim 4, wherein the first upper member, the first lower member, the second upper member, and the second lower member are configured to be from different sections of the same piece of material.

6. The safety airbag device according to claim 5, wherein a size of the second gas outlet is configured to be greater than a size of the second gas inlet.

7. The safety airbag device according to claim 6, wherein a volume of the first cavity in the inflated state is designed to be greater than a volume of the second cavity in the inflated state.

* * * * *